United States Patent
Herman et al.

(10) Patent No.: US 6,786,696 B2
(45) Date of Patent: Sep. 7, 2004

(54) ROOT NOTCHED TURBINE BLADE

(75) Inventors: William Charles Herman, Blue Ash, OH (US); Brian Alan Norton, Cincinnati, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 176 days.

(21) Appl. No.: 10/139,534

(22) Filed: May 6, 2002

(65) Prior Publication Data

US 2003/0206803 A1 Nov. 6, 2003

(51) Int. Cl.⁷ .............................................. F01D 5/30
(52) U.S. Cl. ...................... 416/96 R; 416/193; 416/248
(58) Field of Search ........................ 416/96 R, 193 A, 416/248, 219 R, 214 A, 221, 220 R, 415; 415/115, 116

(56) References Cited

U.S. PATENT DOCUMENTS

| | | | |
|---|---|---|---|
| 2,755,062 A | * | 9/1956 | Hill ............................ 415/115 |
| 3,720,480 A | | 3/1973 | Plowman et al. |
| 3,791,758 A | | 2/1974 | Jenkinson |
| 4,010,531 A | | 3/1977 | Andersen et al. |
| 4,444,544 A | * | 4/1984 | Rowley ....................... 416/221 |
| 4,451,205 A | | 5/1984 | Honda et al. |
| 4,474,535 A | | 10/1984 | Dhuic |
| 4,480,957 A | * | 11/1984 | Patel et al. ............. 416/220 R |
| 4,500,258 A | | 2/1985 | Dodd et al. |
| 4,820,126 A | | 4/1989 | Gavilan |
| 4,936,749 A | | 6/1990 | Arrao et al. |
| 5,135,354 A | * | 8/1992 | Novotny ....................... 41/115 |
| 5,139,389 A | * | 8/1992 | Eng et al. .................... 416/248 |

\* cited by examiner

Primary Examiner—Edward K. Look
Assistant Examiner—J. M. McAleenan
(74) Attorney, Agent, or Firm—William S. Andes; Francis L. Conte

(57) ABSTRACT

A turbine blade includes an airfoil and dovetail. The dovetail includes a pair of supporting tangs. A rectangular root block bridges the tangs over a majority of the root end thereof. The block terminates short of one endface of the dovetail to form a root notch thereat for preferentially reducing weight.

20 Claims, 4 Drawing Sheets

ROOT NOTCHED TURBINE BLADE

BACKGROUND OF THE INVENTION

The present invention relates generally to gas turbine engines, and, more specifically, to turbine blades therein.

In a gas turbine engine, air is pressurized in a compressor and mixed with fuel in a combustor for generating hot combustion gases which flow downstream through turbine stages. High and low pressure turbines include corresponding rows of turbine rotor blades extending radially outwardly from supporting rotor disks, with energy being extracted from the hot combustion gases by the rotor blades for rotating the disk which in turn is used for powering the compressor and an upstream fan in a typical turbofan aircraft engine application.

A primary design objective for aircraft engines is maximizing performance thereof while minimizing weight. Accordingly, the various components of the gas turbine engine are designed for removing as much weight as possible therefrom without exceeding acceptable stress limits therein.

Weight reduction is particularly more difficult in engine rotor components since they rotate during operation and must carry substantial centrifugal loads which generate corresponding stress therein. In addition to centrifugal loads, rotor blades are subject to aerodynamic or pressure loads due to the air being compressed or the combustion gases being expanded through the compressor and turbines.

Since a turbine rotor blade is subject to hot combustion gases during operation, it is typically cooled using air bled from the compressor. A typical turbine blade includes a hollow airfoil having various cooling circuits therein which are fed with cooling air obtained from the compressor which enters the turbine blade through inlet apertures extending radially through supporting dovetails of the blades.

The dovetail of a turbine blade typically includes corresponding pairs of upper and lower dovetail lobes or tangs in a fir tree configuration. The perimeter of the rotor disk includes a row of axial dovetail slots defined between corresponding disk posts having complementary upper and lower supporting lobes or tangs.

The disk slots are typically manufactured using a conventional broaching process in which a series of increasingly larger cutting tools are carried axially through the rotor perimeter until the final fir tree configuration of the disk slots is achieved.

The disk tangs are therefore axially straight between the forward and aft endfaces of the disk. And, the corresponding dovetail tangs are also axially straight for mating with the complementary disk tangs.

In this way, the two pairs of dovetail tangs provide four axially straight pressure surfaces which engage the corresponding pressure surfaces of the disk tangs for carrying centrifugal and other loads from each blade during operation into the perimeter of the disk which supports the blades.

In other designs, the dovetail slots may be skewed or angled through the disk rim relative to the engine centerline or axial axis, and the blade dovetails are correspondingly skewed or angled.

Since the dovetail tangs extend circumferentially oppositely from each other they define corresponding necks of locally minimum area directly above each of the lower and upper pairs of tangs. These dovetail necks must be sufficiently sized in area to spread the centrifugal loads thereacross for minimizing the maximum or peak stresses in the dovetail. The peak stress in the dovetail must be limited to ensure a suitable useful life of the blade in operation. Accordingly, the blade dovetails have minimum sizes controlled by a maximum acceptable peak stress therein.

In order to enhance the strength of the radially innermost or lower dovetail tang pair, the root end thereof may include a rectangular block of additional material extending the full axial length of the dovetail between the forward and aft endfaces thereof, and extending over the lateral or circumferential width of the dovetail between the base ends of the corresponding opposite tangs. The root block typically joins the lower tangs at corresponding fillets of suitable radius for reducing stress concentrations thereat.

The resulting blade dovetail is relatively complex in view of the fir tree configuration required therefor for transferring all operational loads from each blade into the rotor disk.

Reduction in the mass or weight of the individual blade dovetails is presently limited by the maximum acceptable peak stress therein. Since a typical gas turbine engine includes a substantial number of turbine blades in each stage row, it would be desirable to further reduce weight of the engine by correspondingly reducing weight of the dovetails, provided the acceptable peak dovetail stress is not exceeded.

Accordingly, it is desired to provide an improved dovetail having further weight reduction without exceeding maximum permissible peak stress therein.

BRIEF DESCRIPTION OF THE INVENTION

A turbine blade includes an airfoil and dovetail. The dovetail includes a pair of supporting tangs. A rectangular root block bridges the tangs over a majority of the root end thereof. The block terminates short of one endface of the dovetail to form a root notch thereat for preferentially reducing weight.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
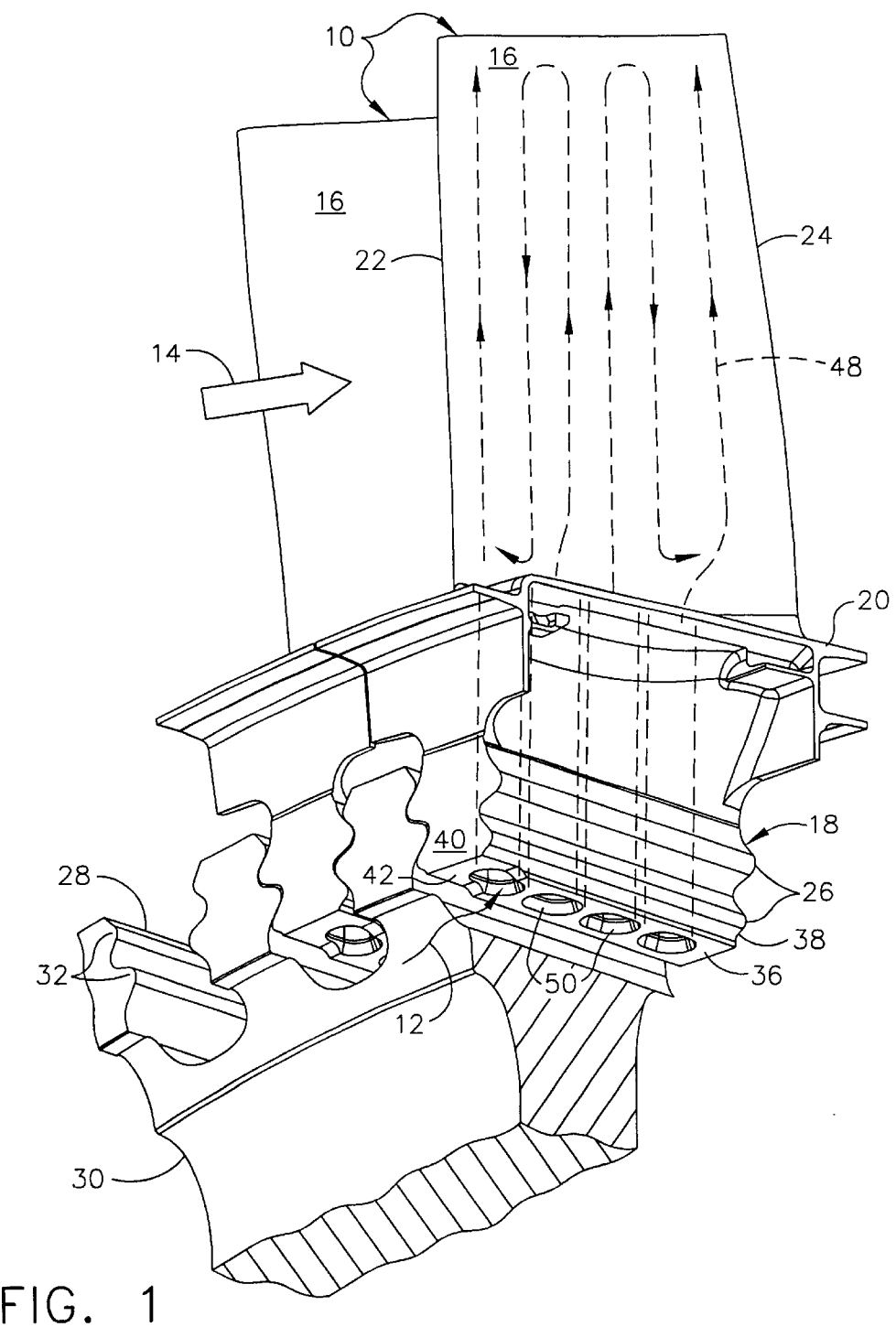
FIG. 1 is a partly sectional, isometric view of a pair of adjoining turbine rotor blades mounted by axial dovetails in the perimeter of a supporting rotor disk.

Illustrated in FIG. 1 are exemplary turbine blades 10 of a turbofan gas turbine aircraft engine. The engine includes a conventional compressor (not shown) for pressurizing air 12 which is mixed with fuel in a combustor (not shown) and ignited for generating hot combustion gases 14 which flow downstream through high and low pressure turbines that extract energy therefrom.

The exemplary turbine rotor blades 10 illustrated in FIG. 1 are found in the second stage of a two stage high pressure turbine which extracts energy from the gases for powering the compressor. A low pressure turbine (not shown) extracts additional energy from the gases for powering a fan (not shown) mounted upstream from the compressor in a typical turbofan aircraft engine application.

Each turbine blade 10 includes a preferably hollow airfoil 16 integrally joined to an axial-entry dovetail 18 at a platform 20 which defines the radially inner boundary for the combustion gases.

Figure 2:
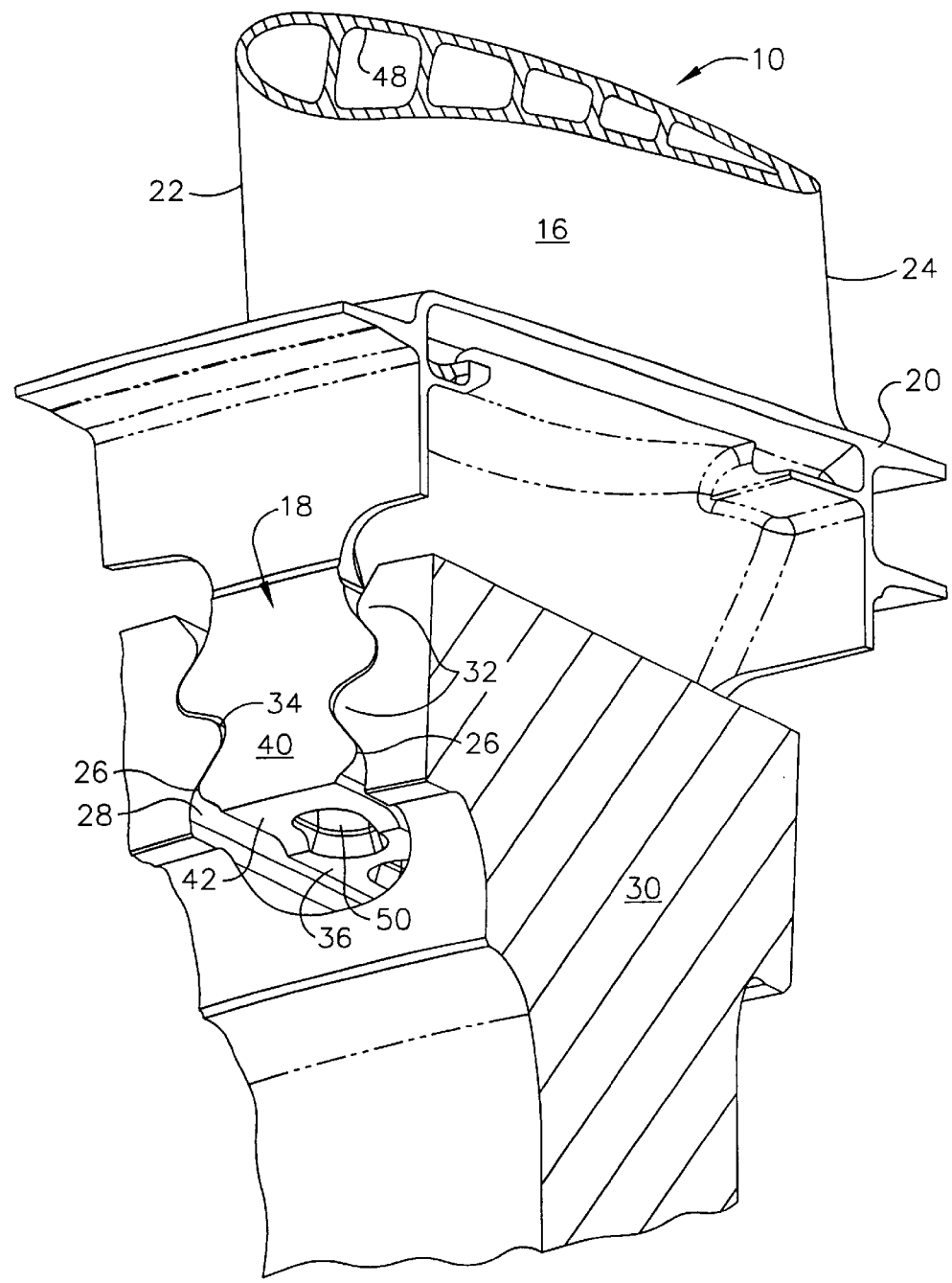
FIG. 2 is an enlarged view of the dovetail portion of the blade illustrated in FIG. 1 mounted in the disk by the axial dovetail having a root notch therein for preferentially reducing weight thereof.

As additionally shown in FIG. 2, each airfoil includes a leading edge 22 which first receives the combustion gases, and an axially opposite trailing edge 24, with a generally concave pressure side extending therebetween, and an opposite, convex, suction side configured for extracting energy from the combustion gases.

Figure 3:
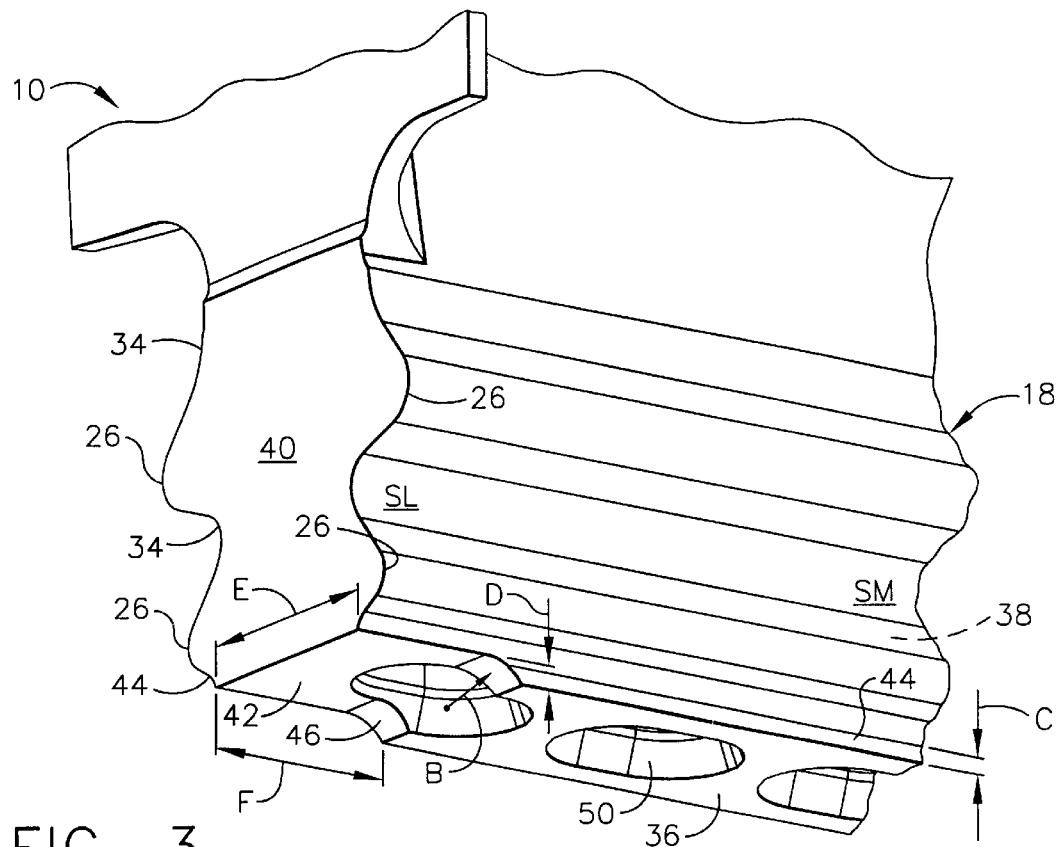
FIG. 3 is an enlarged isometric view of the blade dovetail illustrated in FIG. 2 having a preferred embodiment of the root notch therein.

As shown in FIGS. 2 and 3, the preferred embodiment of the blade dovetail 18 includes an upper pair of laterally or circumferentially opposite lobes or tangs 26 and a lower pair of the tangs 26 configured in a typical fir tree configuration for supporting the individual blade in a complementary axial dovetail slot 28 formed in the perimeter of a supporting rotor disk 30 as illustrated in FIGS. 1 and 2. Each dovetail slot 28 is defined circumferentially between radially outwardly extending disk posts having axially extending lobes or tangs 32 complementing the double dovetail tangs for providing four pressure contact surfaces therebetween through which centrifugal and other loads from the blades are carried into the supporting rotor disk.

As best illustrated in FIG. 3, the upper and lower dovetail tangs are symmetrical about the radial or longitudinal axis of the turbine blade, and narrow in width to define corresponding rectangular necks 34 of locally minimum cross sectional area above each of the upper and lower tang pairs. The centrifugal loads generated by the blade during rotary operation in the engine are carried radially inwardly first through the upper neck and into the upper dovetail tangs for transfer into the corresponding upper tangs of the dovetail slots in the supporting rotor disk.

Some of these centrifugal loads are also carried through the lower neck of the dovetail and by the lower dovetail tangs into the corresponding lower tangs of the dovetail slot in the rotor disk. In this way, the two pairs of dovetail tangs are collectively used for supporting the entire centrifugal and other loads generated in the turbine blade during rotor operation into the supporting rotor disk.

In order to reduce weight of the individual turbine blades, the corresponding dovetails 18 are made as small as possible, but limited by the maximum acceptable peak stress within the dovetail for ensuring a suitable useful life of the blade during operation in the engine. Since the dovetail necks 34 have minimum cross sectional area, they are typically the site of the peak stress in the dovetail.

As shown in FIGS. 1 and 3, the dovetail preferably also includes an integral rectangular root block 36 laterally or circumferentially bridging the lower tangs 26 over a majority of the root end thereof. In a conventional blade dovetail, the root block would commence at the forward endface of the dovetail and extend completely to and terminate at the aft endface of the dovetail. The rectangular block enhances the structural integrity and strength of the dovetail, but is quite thin in radial span to limit the increase in weight provided thereby.

The inventors have discovered that the axially straight configuration of the disk tangs 32 illustrated in FIG. 1, for example, creates an axial variation in the supporting stiffness thereof. In particular, the disk tangs 32 are effectively stiffer at their axial middle portions than at their axially opposite ends near the forward and aft faces of the disk perimeter.

Accordingly, the axial variation in stiffness of the disk tangs results in an axial variation in the centrifugal forces carried between the dovetail tangs 26 and the disk tangs 32.

As shown in FIG. 3, detailed stress analysis indicates that the peak or maximum stress SM occurs in the lower dovetail neck 34 near the axial middle of the dovetail between its two opposite endfaces 38, 40. Accordingly, the size of the double-tang dovetail illustrated in FIG. 3 cannot be reduced under conventional practice any more than that size at which the locally maximum stress SM approaches but does not exceed the permitted or acceptable peak stress for the particular material being used for the dovetail.

Correspondingly, the inventors have also discovered that the operational stresses in the dovetail are significantly below the maximum stress SM at both endfaces 38, 40 of the dovetail due to that axial variation in stiffness of the disk tangs.

In accordance with the present invention, the root block 36 illustrated in FIG. 3 does not extend completely over the entire root end of the dovetail, but instead terminates short of the forward endface 40 to form a corresponding root notch 42 thereat. This preferentially located root notch locally decreases the strength of the dovetail which corresponds with a local increase in stress during operation. Accordingly, significant additional weight reduction may be provided in the dovetail 18 by maximizing the size of the root notch 42 without otherwise increasing the maximum stress in the blade dovetail beyond the given acceptable maximum stress.

As shown in FIG. 3, the root block 36 is an integral extension of the lower tang pair and is disposed radially therebelow in a common casting therewith. The entire turbine blade is initially manufactured by casting of a suitable superalloy for withstanding the hostile temperature and stress environment in the high pressure turbine. The dovetail including its double tang pairs is initially cast with excess material which may be removed by conventional precision grinding to achieve the final configuration and size thereof, and smooth surface finish therefor.

Figure 4:
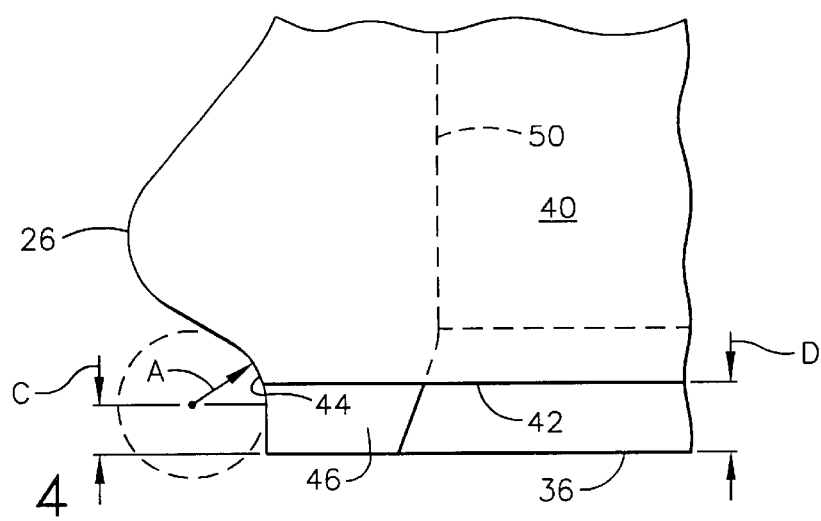
FIG. 4 is an enlarged end view of a portion of the blade dovetail and root notch illustrated in FIG. 3.

As shown in FIGS. 3 and 4, the root block 36 is preferably joined to the lower tangs 26 at a first fillet 44 having a suitably large radius A for minimizing stress concentration thereat. As shown in FIG. 3, the root notch 42 is flat and joins the root block at a second fillet 46 having a correspondingly large radius B for also reducing stress concentration thereat. For example, the first fillet radius may be about 50 mils (1.27 mm), and the second fillet radius may be about 100 mils (2.54 mm).

The root block has a height C extending from the tangent with the first fillet 44, and the second fillet 46 is preferably at least as large in depth D as the block height C. In this way, the depth of the root notch may be maximized for maximizing removal of excess material at the forward end of the dovetail without excessively increasing dovetail stresses past the maximum allowable stress permitted.

In the preferred embodiment, the second fillet 46 and the corresponding root notch 42 are larger in depth D than the height C of the block. And, as illustrated in FIG. 4, the second fillet 46 extends into the first fillet 44 slightly past the tangent of the first fillet with the straight sidewall of the root block 36.

In this way, maximum material may be locally removed from the root end of the dovetail near the forward endface 40, which corresponds with reduced stiffness of the corresponding disk tangs that support the dovetail tangs. The root notch results in a corresponding increase in local stress in the lower neck 34 near the forward endface.

As shown in FIG. 3, the root block 36 has a width E extending laterally in the circumferential direction between the lower tangs 26 at the corresponding first fillets 44 thereof. Correspondingly, the root notch 42 has a width equal to the block width E for maximizing the amount of material removed in the local region of the notch.

The root notch 42 also has an axial length F extending from the forward endface 40 to the second fillet 46 which notch length F is on the order of the block width E. In this way, the root notch is relatively short in the axial direction with maximum width in the circumferential or lateral direction, and is locally disposed directly adjacent to the forward endface 40 of the dovetail which is correspondingly supported by the relatively low stiffness portions of the disk tangs.

The depth D and length F of the root notch 42 are collectively sized for not only reducing weight of the entire dovetail, but to effect stress SL in the portion of the lower neck 34 directly above the root notch, which stress closely approaches but does not exceed the maximum stress SM in the remainder of the lower neck.

As indicated above, the axial configuration of the disk tangs effects greater stiffness near the axial middle of those tangs than at the axially opposite ends thereof. This typically causes the maximum dovetail stress SM to occur near the axial middle of the dovetail in the lower neck 34 as illustrated in FIG. 3. The stress SL in the lower neck near the forward endface is correspondingly less than the maximum stress SM, and with the introduction of the root notch 42, the magnitude of the lower stress SL increases but is limited to not exceed the maximum stress SM at the middle of the neck.

In this way, a significant reduction in dovetail mass may be obtained by locally introducing the root notch 42 at the forward endface 40, which correspondingly increases the stress in the lower neck near the forward endface. Since the local stress SL is nevertheless less than the maximum stress SM, the useful life of the turbine blade is not reduced, but a significant weight reduction is effected.

For example, the root notch 42 may be relatively small with a notch depth D of about 40 mils (1 mm), with the notch length F being about 400 mils (10 mm), over the full width E of the root end of the lower tangs. In an exemplary second stage rotor blade, this results in a reduction of dovetail mass of about one percent, a significant amount in an aircraft turbofan engine.

Since the root block 36 illustrated in FIG. 3 is specifically introduced for strengthening the dovetail, excessive removal thereof is not desirable and is preferably limited. In the preferred embodiment, the root block terminates in full at the introduction of the root notch 42, with the root notch having a depth greater than the height of the root block to maximize weight reduction without excessive local stress therefrom. In alternate embodiments, the root block may terminate only in part at the introduction of a correspondingly shallow root notch having a depth less than the height of the root block for reducing the local increase in stress, with less weight reduction.

Figure 5:
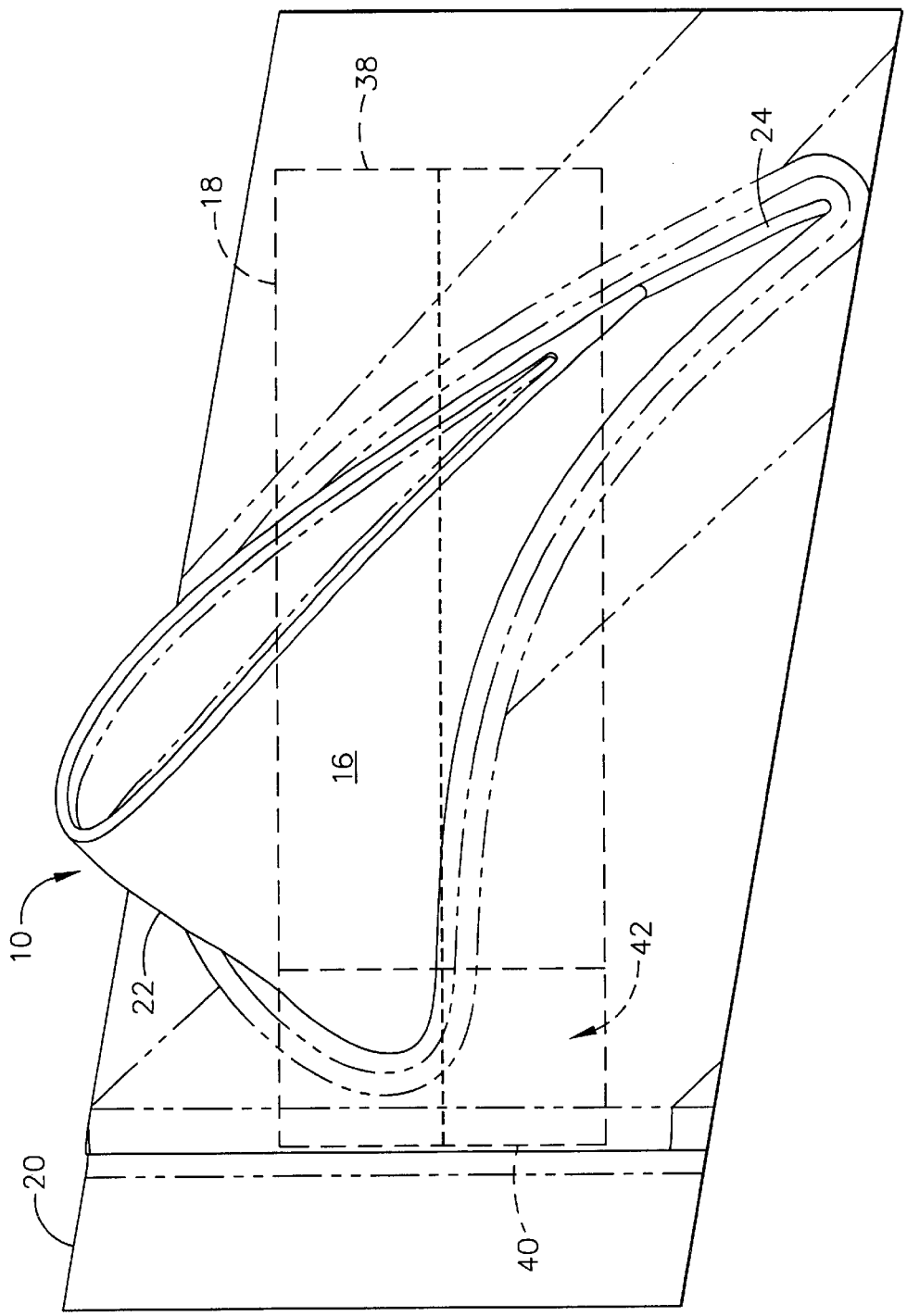
FIG. 5 is a top view of one of the blades illustrated in FIG. 1 showing orientation of the airfoil disposed above the underlying dovetail.

As shown in FIG. 5, the airfoil leading edge 22 is disposed above the dovetail forward endface 40 longitudinally or radially aligned with the root notch 42. Since the airfoil 16 is twisted for aerodynamic reasons, the trailing edge 24 is laterally or circumferentially offset from the dovetail aft endface 38 and creates an overhang over the side of the dovetail.

The overhanging trailing edge affects the load transfer through the dovetail tangs and into the disk posts. Stress analysis indicates that the stress in the lower neck of the dovetail near the aft endface under the trailing edge overhang is closer in magnitude to the maximum stress SM in the lower neck near the middle of the dovetail than the stress in the lower neck at the forward endface.

Accordingly, the root notch 42 is disposed in the root block solely at the forward endface and not at the aft endface in the preferred embodiment. And, the root block 36 is preferably uniform in profile from the root notch completely to the aft endface.

In this way, the configuration of the root block 36 is maximized from the aft endface terminating short of the forward endface for maximizing strength of the dovetail, with the root notch providing a local reduction in weight of the dovetail corresponding with the axial location in the dovetail matching the location of decreased axial stiffness of the disk tangs.

The turbine airfoil 16 illustrated in FIGS. 1 and 2 is preferably hollow and includes internal cooling circuits 48 which may have any conventional configuration. Correspondingly, the dovetail includes a plurality of axially aligned inlet apertures 50, four for example, extending longitudinally or radially through the dovetail in flow communication with the cooling circuits of the airfoil. Cooling air 12 bled from the engine compressor is suitably channeled through the disk slots 28 and enter the several inlet apertures 50 for providing cooling air through the dovetail and into the airfoil.

In the preferred embodiment illustrated in FIG. 3, the root notch 42 terminates in length within the first inlet aperture 50 closest to the dovetail forward endface 40.

Stress analysis indicates that if the root notch terminates in the rib between the first and second inlet apertures illustrated in FIG. 3, undesirable local compressive stress would occur in the rib which could decrease the useful life of the turbine blade. By terminating the root notch short of the inter-aperture rib, in the middle of the first aperture for example, substantial weight reduction may be obtained in the dovetail without exceeding the maximum stress therein during operation, and without effecting undesirable stresses in the inter-aperture ribs.

Notwithstanding the complex configuration of the double tang dovetail in the exemplary turbine rotor blade, significant weight reduction may be obtained therein without exceeding the maximum stress in the original location thereof, and without introducing excessive local stress which would reduce the useful life of the blade. The root notch is introduced selectively only near the forward endface of the dovetail in a preferred configuration with the cooperating first and second fillets for reducing stress concentrations associated therewith. The resulting turbine blade can enjoy the same long life as a corresponding blade without the root notch, but with the additional advantage of significant weight reduction.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

1. A turbine blade comprising:

an airfoil integrally joined to a dovetail, and including a leading edge and an axially opposite trailing edge;

said dovetail includes a pair of laterally opposite upper tangs and a pair of lower tangs joined thereto by a neck therebetween, with said double tang pairs being symmetrical for supporting said blade in a complementary slot in the perimeter of a rotor disk; and said dovetail further includes a rectangular root block bridging said lower tangs over a majority of a root end thereof and commencing at an aft endface of said dovetail and terminating at least in part short of an axially opposite forward endface of said dovetail to form a root notch thereat.

2. A blade according to claim 1 wherein said root block is joined to said lower tangs at a first fillet, and said root notch joins said block at a second fillet.

3. A blade according to claim 2 wherein said root block has a height extending from said first fillet, and said root notch is at least as large in depth as said block height.

4. A blade according to claim 3 wherein said root block has a width extending laterally between said lower tangs at corresponding first fillets thereat, and said root notch has a width equal to said block width.

5. A blade according to claim 4 wherein said root notch is disposed in said root block solely at said forward endface of said dovetail and not at said aft endface, and said root block is uniform in profile from said notch completely to said aft endface.

6. A blade according to claim 5 wherein:

said airfoil is hollow, and said dovetail includes a plurality of inlet apertures extending longitudinally therethrough in flow communication with said airfoil; and said root notch terminates within the inlet aperture closest to said dovetail second endface.

7. A blade according to claim 5 wherein said second fillet is larger in depth than said block height and extends into said first fillet.

8. A blade according to claim 5 wherein said root notch has a length extending from said forward endface to said second fillet on the order of said block width.

9. A blade according to claim 5 wherein said root notch depth and length are collectively sized to effect stress in said neck above said notch closely approaching but not exceeding maximum stress in said neck.

10. A blade according to claim 5 wherein said notch depth is about 1 mm and said notch length is about 10 mm.

11. A turbine blade comprising:

an airfoil integrally joined to a dovetail;

said dovetail including a pair of laterally opposite tangs for supporting said blade in a complementary slot in the perimeter of a rotor disk;

said dovetail further including a rectangular root block bridging said tangs over a majority of a root end thereof and commencing at a first endface of said dovetail and terminating at least in part short of an axially opposite second endface of said dovetail to form a root notch thereat.

12. A blade according to claim 11 wherein said root block is joined to said tangs at a first fillet, and said root notch joins said block at a second fillet.

13. A blade according to claim 12 wherein said root block has a height extending from said first fillet, and said root notch is at least as large in depth as said block height.

14. A blade according to claim 13 wherein said second fillet is larger in depth than said block height and extends into said first fillet.

15. A blade according to claim 13 wherein said root block has a width extending laterally between said tangs at corresponding first fillets thereat, and said root notch has a width equal to said block width and a length extending from said second endface to said second fillet on the order of said block width.

16. A blade according to claim 15 wherein said dovetail includes a neck above said tangs, and said root notch depth and length are collectively sized to effect stress in said neck above said notch closely approaching but not exceeding maximum stress in said neck.

17. A blade according to claim 15 wherein said notch depth is about 1 mm and said notch length is about 10 mm.

18. A blade according to claim 13 wherein:

said airfoil includes a leading edge longitudinally aligned with said root notch at said dovetail second endface, and a trailing edge laterally offset from said dovetail first endface; and said root notch is disposed in said root block solely at said second endface and not at said first endface, and said root block is uniform in profile from said notch completely to said first endface.

19. A blade according to claim 13 wherein:

said airfoil is hollow, and said dovetail includes a plurality of inlet apertures extending longitudinally therethrough in flow communication with said airfoil; and said root notch terminates within the inlet aperture closest to said dovetail second endface.

20. A blade according to claim 13 wherein said dovetail includes an upper pair of said tangs and a lower pair of said tangs joined at a neck therebetween, and said root block and notch are disposed below said lower tang pair.

* * * * *